Patented Nov. 11, 1930

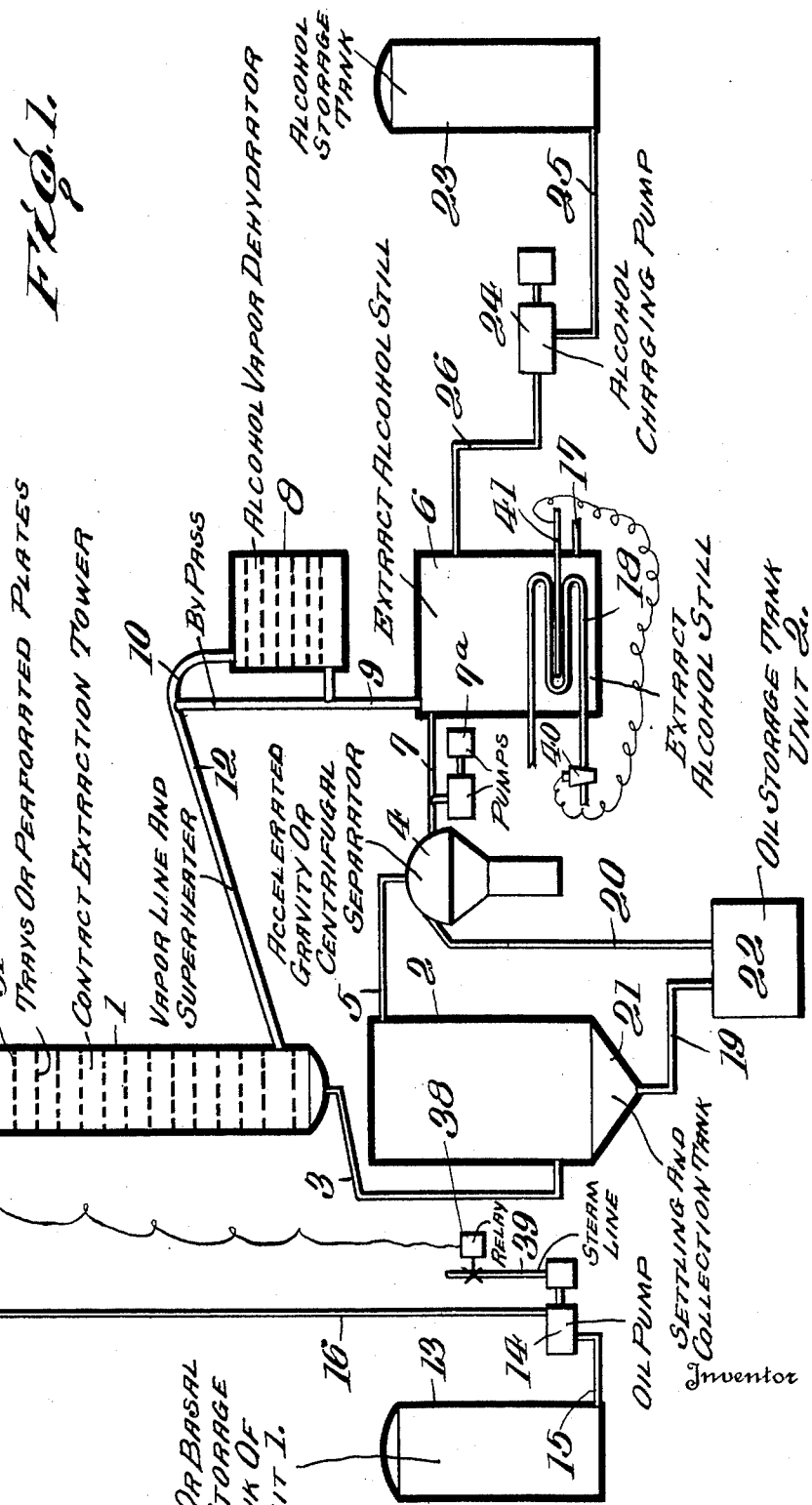

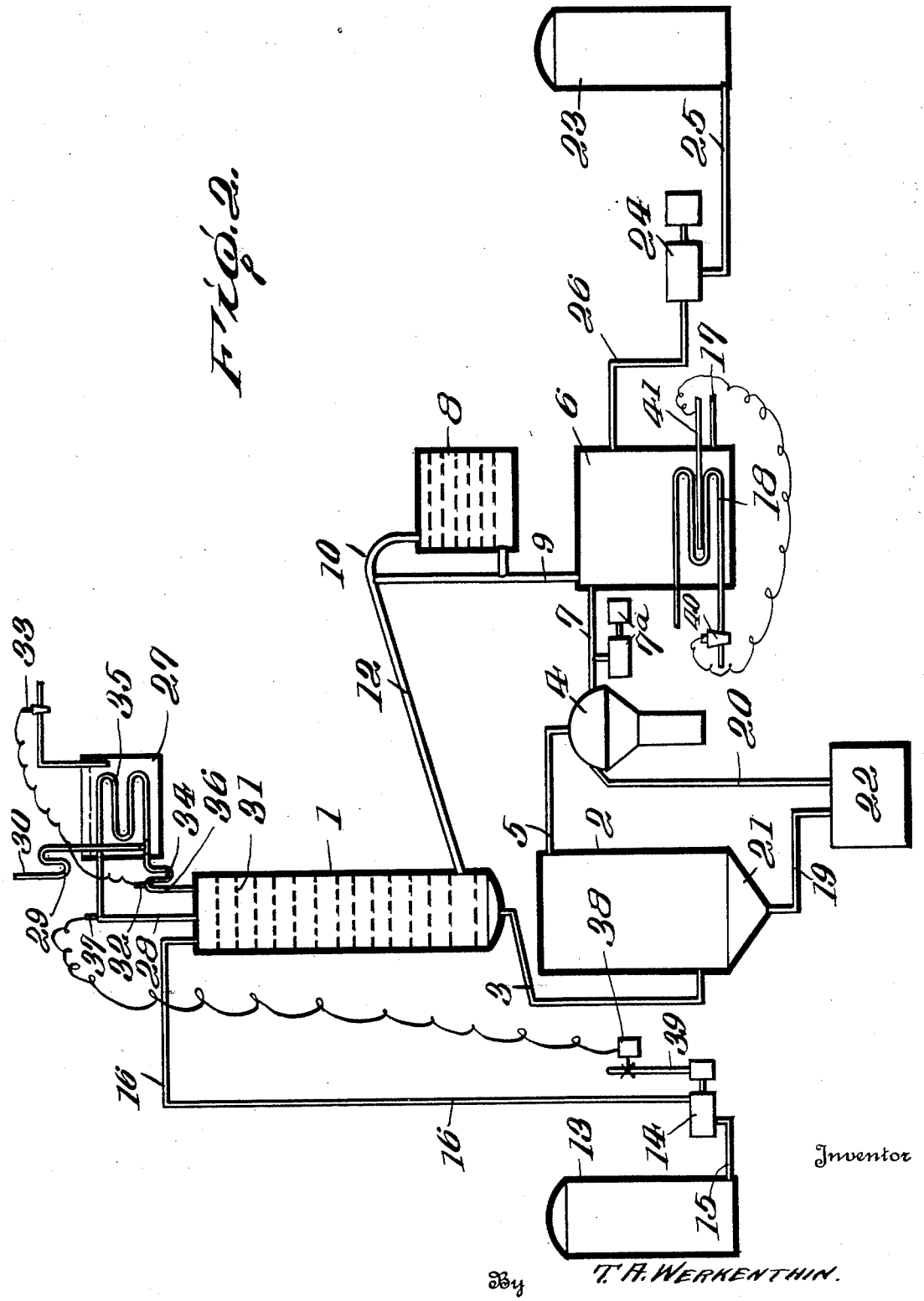

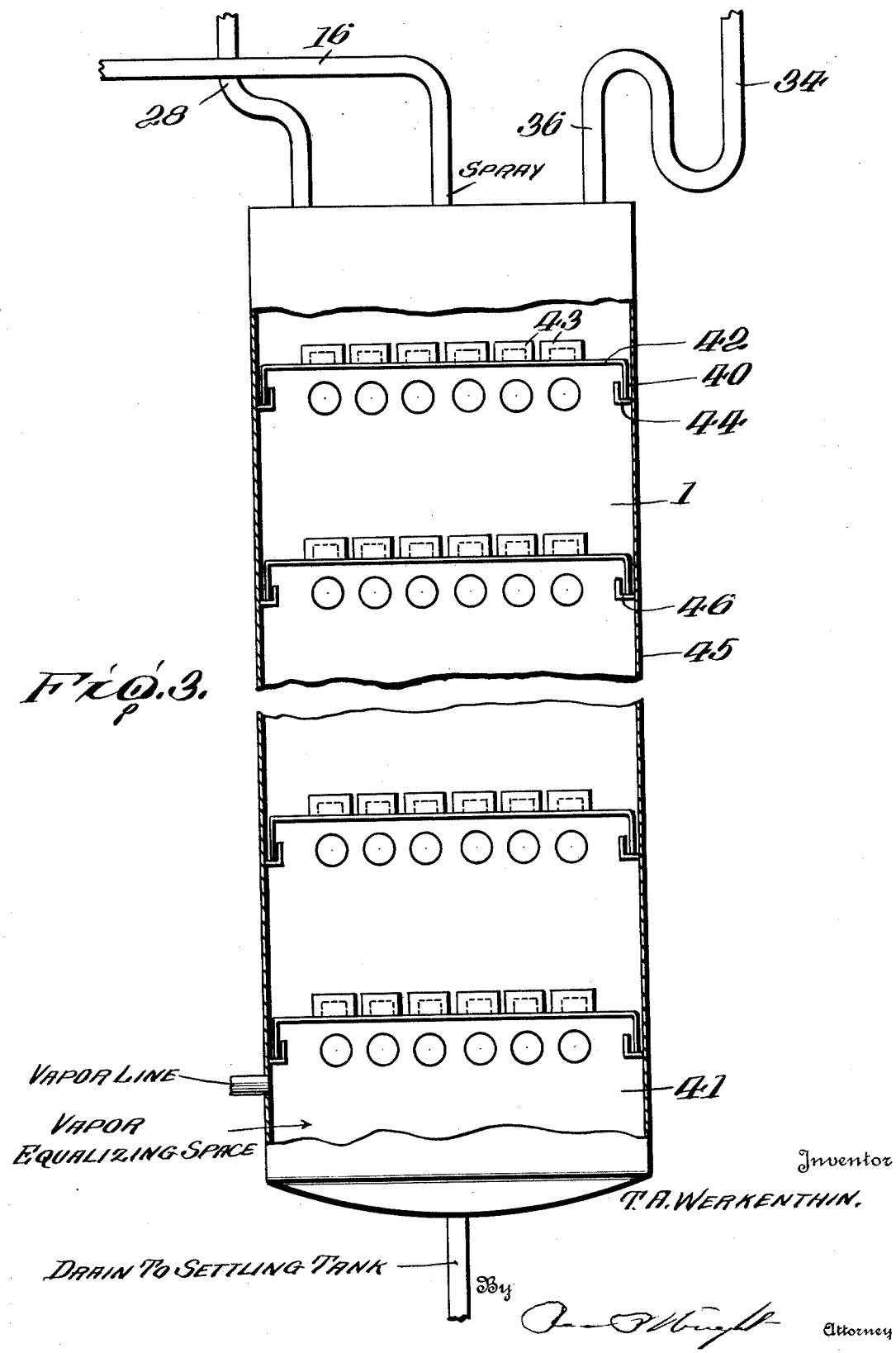

1,781,420

UNITED STATES PATENT OFFICE

THEODORE A. WERKENTHIN, OF LIMA, OHIO, ASSIGNOR TO THE SOLAR REFINING COMPANY, OF LIMA, OHIO, A CORPORATION OF OHIO

APPARATUS FOR FRACTIONALLY EXTRACTING PETROLEUM HYDROCARBONS WITH ALCOHOL

Application filed December 30, 1927. Serial No. 243,645.

My invention relates to apparatus for fractionally extracting petroleum hydrocarbons with alcohol.

In my copending application, Serial No. 750,783, filed Nov. 19, 1924, I have disclosed the treatment of petroleum hydrocarbons with alcohol whereby by fractional extraction there are obtained various desirable products including cracking stock and various grades of lubricating oils. In the process there set forth, the oil is introduced into an extraction tank where it is treated with alcohol. The reaction product is then passed into a settling tank to allow any undissolved oil which may have been carried along mechanically to settle out. The oil extract is thereafter passed into a still where under heat treatment the extraction product separates into two components, alcohol and oil. The alcohol is passed into a condenser, dehydrated and reused. The original stock from which an initial extraction product has been obtained is thereafter repeatedly subjected to the same treatment to produce a series of products.

My present invention is an improvement over the above process. Instead of carrying out the extraction process in an extraction tank, I propose to use an extraction tower whereby the extraction is greatly improved, this in a large measure being due to the allowance of a maximum amount of contact between the alcohol vapor and the raw oil. I propose to carry out the tower extraction process without undue frictional resistance so that the pressure in the system is above atmospheric but exceedingly low, dependent to a great extent on the height of the liquids through which the alcohol vapor penetrates. In the preferred form of my invention the oil is extracted in a continuous manner by anhydrous alcohol at or near its boiling point under a moderate pressure, the process being carried out in an extraction tower in which the oil flows in countercurrent direction to that of the vapor supply of alcohol.

In my present process I employ an alcohol condensing step so that any alcohol passing from the top of the extraction tower may be recovered and returned thereto in liquid form. Considerable trouble was experienced when the tower process was originally developed in condensing the alcohol so that the condensed alcohol would not be cooled too much. This has been overcome by automatically adjusting the temperature of the condenser cooling medium so that it will provide ample condensation for the alcohol vapor but will not cool the condensed alcohol too much.

My invention also contemplates the automatic regulation and admission of the raw oil into the extraction tower and, in its preferred form, this is accomplished by means of a thermostatic control.

The object of my invention is to provide an apparatus suitable for economically and efficiently carrying out the process above referred to and hereinafter set forth in detail.

My apparatus has the following features of novelty:

(1) The extraction of hydrocarbon oil is carried out in an extraction tower which is provided with a series of plates preferably perforated. The use of a tower provides for a maximum amount of contact between the alcohol vapor and the raw oil. Each of the trays hold a shallow body of oil and in this manner an enormous area is presented for the contact of the alcohol vapor.

(2) The extraction tower is provided with automatic means for regulating and admitting the supply of raw oil thereto. This is preferably accomplished by a thermostatic control operating as follows: The steam pump which supplies raw oil to the extraction tower is in operative connection with a relay. A thermostatic element is inserted in the extraction tower and causes the relay and pump to function when the temperature in the extraction tower falls below a predetermined limit. The above is illustrative of one form of apparatus providing automatic means for regulating and admitting the supply of raw oil to the extraction tower. However, it is obvious that other forms of apparatus may be used and still come within the spirit of my invention.

(3) The extraction tower is in operative connection with the condenser and means are provided for automatically controlling the temperature of the condenser cooling medium so that the alcohol vapors condensed in the condenser which are adapted to be returned to the extraction tower will be cooled to only a predetermined temperature. In the preferred form of my invention this is accomplished by inserting a thermostatic element into the alcohol return pipe which controls a water regulating valve admitting water to the condenser, this valve being opened and closed by the operation of the thermostat. This arrangement of elements is illustrative of one form thereof which has been found suitable. However, I desire to indicate that my invention resides broadly in providing means for automatically adjusting the temperature of the condenser cooling medium so that it will provide ample condensation for the alcohol vapor but will not cool the condensed alcohol too much.

(4) In some cases it is necessary to dehydrate the alcohol and this is accomplished in a dehydrator chamber. Means are provided for cutting the alcohol dehydrator in or out of operation with the alcohol extract still and the extraction tower. In the system set forth the alcohol very well retains its dehydrated condition and frequently it is not necessary to have the dehydrator in operative connection with other elements of the system.

(5) The extract alcohol still is equipped with means for automatic temperature control. In the preferred form this is accomplished thermostatically.

The apparatus briefly described above and more fully set forth hereinafter is particularly useful for the extraction with alcohol of any of the following oils:

1. Topped crude oil which I define as asphalt or paraffin base or mixed asphalt-paraffin base crude oil which is partially or totally deprived, either by natural or artificial means, of any one or all of the following fractions: natural gasoline, kerosene, gas oil, cracking stock, fuel oil, and heavy distillate. Besides topped crude oil as defined above, I may use the following oils for fractional extraction with alcohol, 2. Wax bearing distillate,
3. Wax bearing residual oils,
4. Heavy hydrocarbon residual fuel oils which have not been vaporized or distilled,
5. Spent or used internal combustion engine lubricating oil, and
6. Heavy residual oils resulting from either pyrolytic disruption or polymerization of petroleum hydrocarbons or both.

In carrying out my invention any of the above-mentioned oils may be utilized as the starting material from which any or all of the following may be selectively extracted therefrom with alcohol: cracking stock, waxes, different grades of lubricating oils and residual oils. Any one of the above oils may be extracted with alcohol so as to first dissolve the most soluble components which generally constitute the cracking stock. Thereafter, the remaining oil which has been deprived of the cracking stock is repeatedly subjected to an alcohol-extraction treatment to produce a series of lubricating oils of remarkably high character; waxes notable for their good crystalizing qualities; and a residuum or asphaltic substance. This residual oil furnishes an ideal binder material free from grit and impurities.

The process of extraction is carried out at or near the boiling point of the specific anhydrous alcohol used, the exact temperature of which may vary, depending on the pressure carried in the system and particularly in the extract still. Stated differently, the temperature at which the alcohol boils is dependent on the vapor pressure in the extraction unit. The process is continuous, automatically regulated, and operates under a moderate pressure effecting a better and more economical extraction than has heretofore been known. In the preferred form of my invention the extraction products are allowed to retain a small quantity of alcohol as set forth in my copending application, Serial No. 243,644, filed Dec. 30, 1927.

The alcohol may be mixed with the oil to be extracted either in liquid form or in the vapor form. The oil to be extracted may be introduced in either the liquid, solid, or vapor form, although the liquid form of the oil is the most convenient and desirable one to use.

Apparatus suitable for carrying out my invention is illustrated in the accompanying drawings, in which Figures 1 and 2 are elevations of successive extraction units. Figure 3 is a side elevation partly in section of the extraction tower used in each unit.

The apparatus set forth in Figure 1, which for convenience will be referred to as unit 1, will be described in detail. Figure 2 shows a successive extraction unit similar to the extraction unit 1 and will be referred to as unit 2. Units 3 and 4, substantially identical with unit 1, are usually employed. In view of their substantial identity, it is not necessary to have these latter units appear on the drawing. The size of the members in units 2, 3 and 4 differ somewhat from those of unit 1 but otherwise there are no essential differences between the various units, and therefore, the description of Figure 1 will serve for the others.

Referring to Figure 1, unit 1 comprises a contact-extraction tower 1 and a settling and collection tank 2 connected by the conduit 3. The settling tank is connected to an accelerated gravity or centrifugal separator 4 by the conduit 5.

The extract-alcohol still 6 which receives the clear extract solution of oil in alcohol is connected with the centrifugal separator 4 by means of the conduit 7, and through the alcohol dehydrator 8 by the conduits 9 and 10 which continue as the vapor line and superheater 12. A by-pass line 11 is provided so that in case the dehydrator 8 is not required, the vapor from the extract still 6 may pass directly into the vapor line and superheater 12 without passing through the dehydrator. The raw oil storage tank 13 is in operative connection with the extraction tower 1 by means of the conduit 15, oil pump 14 and conduit 16. The latter introduces the oil to be extracted into the top of the contact extraction tower 1 so that a thin film of oil is exposed on the perforated plates 31, to be readily dissolved by the alcohol vapor contacting therewith. The extracted oil accumulated in the bottom of the extract-alcohol still 6, which is preferably heated with a steam coil 18, is withdrawn through the conduit 17 into a suitable storage tank. The undissolved oil in the bottom 21 of the settling and collecting tank 2 is withdrawn through the conduit 19, and the undissolved oil from the accelerated gravity or centrifugal separator 4 passes through the conduit 20, and flows into the tank 22 which is the storage tank of the undissolved oil to be circulated through the succeeding unit 2. The alcohol storage tank 23 is used only in charging and replenishing the amount of alcohol needed in the system. Charging is accomplished by the pump 24 which is in operative communication with the extract-still 6 and tank 23 by means of conduits 25 and 26.

The top of the contact-extraction-tower 1 is provided with a vapor outlet 28 communicating with condenser 27 and the water cooled condenser coils 35 which are equipped with the liquid seal 29 and the vent 30 to prevent escape and loss of alcohol vapor.

The condenser coils 35 connect with the liquid return conduit 36 which carries inserted therein a thermostatic element 32. The automatic water regulating valve 33 is in operative connection with the thermostat 32. The alcohol return conduit 36 carries a seal 34.

The oil flow is regulated by the thermostatic element 37 which is in operative connection by means of the relay 38 with the steam valve 39 of the pump 14.

The extraction tower 1 is preferably a bubble tower so as to allow a maximum amount of contact between the alcohol vapor and the raw or undissolved oil and this is obtained without undue frictional resistance, the pressure in the tower being only sufficient to overcome the same. This pressure will, of course, vary, being dependent on and proportional to the height of the liquid through which the alcohol vapors have to penetrate. The tower is provided with a series of perforated plates 31 constructed as hereinafter set forth. Assuming that a tower 40 feet high is employed there will be present about 80 plates. Each plate has a liquid level of 2 inches through which the alcohol vapors penetrate, giving the effect of a column of oil of 160 inches which requires a pressure of 5.14 pounds per square inch above atmospheric. To this pressure it is necessary to add the pressure required to overcome the frictional resistance through the various conduits leading from the still to the extraction tower. Using a column 40 feet high, a pressure of approximately 7 pounds above atmospheric is sufficient. A larger, higher tower having more plates would require a proportionally greater pressure. In general, the pressure used will usually be between 6 and 8 pounds per square inch above atmospheric, but in some cases may be higher but usually not exceeding 25 pounds per square inch above atmospheric.

The extraction tower 1 is provided with a shell 45. At the bottom of the extraction tower 1 there is a vapor equalizing and distributing space 41 which permits the equal distribution of the alcohol vapor in its passage upward. The perforated plates 31 of the extraction tower are made in four sections to permit easy removal in cleaning and assembling. Each perforation has a circular ring 42 which is two inches high and providing a space in which the oil and solvent are retained. Each ring and perforation is covered with a cap 43 which has serrated edges to allow the vapor to pass through the liquid and into the next compartment formed by a similar arrangement of perforated plates, rings and caps. The rings and perforated plates are preferably cast together to insure a leak proof joint. The plates are 6 inches apart and are supported by rims 44 protruding from the inside of the shell 45. A special feature which can be satisfactorily employed in the contact extraction tower due to the low temperature used is the manner in which these parts are gasketed as clearly set forth in Figure 3. The rim 44 has a shallow groove 46 while the cast iron or cast aluminum perforated plate has a slight tongue 40 on its lower surface. The plate is set in the rim groove 46 and molten lead is poured therein to seal the joints just enough to insure a tight joint. As all castings are somewhat rough and irregular, this method of sealing the joint affords perfect protection and at the same time avoids the use of all machining or facing. The castings are used the way they come from the foundry. In removing the plates and caps all that is required is to warm the lead and lift out the plates. The heating can be accomplished with an ordinary blow torch or acetylene torch. This tongue and groove principle with the lead filled joints serve to make a vapor and liquid tight joint between the four sections constituting the plate. The most desirable diameter of the extraction tower is six feet while the height may vary depending on the size of the extraction unit but it is usually desirable to make it between 30 and 40 feet.

The process may be carried out as follows:

Any of the oils previously mentioned may be used in the system. If a paraffin-base oil or mixed paraffin asphalt base oil is used, the extracted fractions of oil may be chilled in order to recover the wax or solid paraffin, but if an asphalt base oil is used, the latter may be directly introduced into the system without any subsequent treatment of the oil other than color treatment. The oil is pumped from the raw oil storage tank 13 by means of a pump 14 into the contact-extraction-tower 1 where the oil spreads in a fine film over the trays or perforated plates 31 and comes in contact with the alcohol vapors from the extract alcohol still 6. The vapors upon coming in contact with the oil will condense giving up their heat of condensation to the oil, thereby raising the temperature of the oil almost to that of the boiling point of the solvent. The condensed alcohol will set upon the thin film of oil and will extract the more soluble portions of the oil because as new quantities of alcohol vapor are introduced from the extract-alcohol still 6 they come in contact with fresh films of oil pumped from the storage tank, from which in turn the more soluble portions are extracted first. This process of extraction continues until the bottom tray of the tower 1 is reached when the undissolved oil together with the dissolved oil extract passes into the settling or collecting tank 2 where the bulk of the undissolved oil separates from the extract. The extract together with small portions of undissolved oil passes into the accelerated gravity or centrifugal separator 4 where the remaining undissolved oil is removed from the extract which is then forced into the extract alcohol still 6 by a pump 7ª where the alcohol is distilled off. The alcohol vapor passes into the dehydrator chamber 8 filled with a suitable dehydrating chemical such as lump lime, anhydrous copper sulphate, or other suitable dehydrating material and maintained at such a temperature as will prevent the alcohol vapors from condensing. The temperature of the alcohol dehydrator chamber 8 is not necessarily closely controlled. It may vary within the boiling point range of the alcohol employed. For instance, with anhydrous ethyl alcohol the temperature will be 190° F. or slightly above the boiling point. The temperature depends on the pressure carried in the still 6. The dehydrated alcohol vapor passes through the vapor line and superheater 12 into the contact-extraction tower 1 as previously described. During such time as the dehydrating chamber 8 is replenished with fresh chemical, or during such times as the dehydrator is not required, due to the fact that the alcohol maintains its water-free state without additional dehydration, the by-pass line 11 is employed so that the alcohol vapor may pass directly into the vapor superheater 12 without going through the dehydrating chamber. The extracted oil accumulating in the bottom of the extract-alcohol still 6 is removed through the conduit 17 into a suitable storage tank. The undissolved oil settling out in the settling and collection tank 2 is withdrawn by means of a conduit 19 into the storage tank 22 which is the oil storage tank for unit 2 having the same function as the oil storage tank 13 for unit 1. The undissolved oil removed in the accelerated gravity or centrifugal separator 4 is also drained into the undissolved oil storage tank 22 by means of the conduit 20. Alcohol is introduced into the extract still 6 from the alcohol storage tank 23 by means of the pump 24. This tank 23 also provides for the replenishing of the alcohol lost due to evaporation and other causes. The contact-extraction tower 1 is provided with a safety reflux-condenser 27 so that any alcohol vapor passing beyond the top tray of the tower will pass into the condenser 27 to be condensed and returned to the tower 1 in liquid form. The temperature of the water or other cooling medium in the condenser 27 is automatically adjusted so that it will provide ample condensation for the alcohol vapors but will not cool down the condensed alcohol. The operation of the automatic water-temperature means is as follows: Alcohol vapor enters the vapor line 28 and passes through the condenser coils 35 where it gives up its latent heat of vaporization and is changed to a liquid which flows into the pipe 36 equipped with the seal 34. Into the liquid return pipe 36 there is inserted the thermostatic element 32, which is so set that if the temperature of the condensed alcohol in the pipe 36 is less than 150° F., it shuts off the water inlet valve 33. As soon as the condensed water warms up, and the temperature of the condensed alcohol in the pipe 36 gets to 150° F. or a degree or two above, the thermostatic element will open the water inlet valve 33 thereby allowing more water to enter the condenser 27 and cool down the condensed alcohol in the coil 35 to the proper temperature of 150° F. Employing this arrangement, there is assured ample water supply for the condensation of the alcohol vapor within the reflux condenser without any unnecessary cooling of the condensed alcohol which flows back into the extraction tower to dissolve the oil introduced.

The auxiliary condenser 27 is expected to function only as a safety measure because it is possible by means of automatic tower temperature control, to so adjust the relation between the inflowing oil to be extracted and the up flowing alcohol vapors in such a way that, although the vapors will come to the top tray, condensation will ensue upon the oil coming in contact with alcohol vapors, and few, if any vapors, will pass beyond the top tray in the tower.

The operation of the thermostatic control for regulating the oil pump 14 is as follows:

In the vapor line 28 leading to the reflux condenser 27 there is inserted a thermostatic control element which actuates a relay-steam control 38, operating the steam valve 39 of the pump 14. When the temperature of the vapor gets to a predetermined point, for example, 180° F., indicating there is sufficient vapor to heat and come in contact with all the oil contained in the tower, it is time to introduce more oil. Then steam valve 39 of the pump is thrown open, and the pump 14 is started, thereby pumping fresh oil into the tower 1. The result is that the alcohol vapor in the top tray will be condensed by the incoming oil producing a drop in the temperature in the vapor line 28 and thereby causing the thermostatic element 37 to again actuate the relay 38, this time to close the steam valve 39 of the pump 14 so that the oil no longer flows into the tower 1. The alcohol vapors will once again pass through the top tray of the tower 1 into the alcohol vapor line 28 and raise the temperature in the line to 180° F., when the whole process described is repeated.

When unit 1 is operated, as above described, there will be produced a cracking stock and a residual oil which accumulates in storage tank 22. This oil undergoes a similar process of extraction in unit 2, which extracts the light lubricating oil components. The dissolved oil extract leaving the contact-extraction tower 1 of unit 2 passes into a settling and collection tank of unit 2 similar to that of unit 1 together with the undissolved oil. The extract in the remaining undissolved oil passes into an accelerated gravity or centrifugal separator 4 of unit 2 where the remainder of the undissolved oil is separated from the alcohol by means of distillation in the extract-alcohol still 6 just as in unit 1. The alcohol vapor passes through the hehydrator 8 of unit 2 into the contact-extraction tower of unit 2 and there extracts fresh quantities of light lubricating oil from the incoming oil. The amount and the extent of the extraction is dependent upon and is proportional to the time of contact, the area of oil exposed, the ratio of oil to alcohol, the temperature of extraction and the type of the oil extracted. Stated differently, the average oil extracted in unit 2 is made up of all the various constituents from the more soluble to those somewhat less soluble, such that the average composition is a fraction termed light lubricating oil, because its properties resemble such. The remaining undissolved oil deprived of its cracking stock components and light lubricating oil components is stored in the oil storage tank of unit 3 which is similar to the other two units described. In unit 3, the lubricating oil of consistency of and having properties resembling those of a commercial grade of medium grade lubricating oil is extracted in exactly the same manner as in the preceding two units. The undissolved oil accumulated in the settling tank and derived from the accelerated gravity or centrifugal separator of unit 3 passes into the oil storage tank of unit 4 where heavy lubricating oil of high viscosity may be extracted. The process or cycle of extraction in unit 4 is similar to that of the preceding units. The residuum or remaining oil from the last extraction will, in general, be of the nature of an asphaltum, its precise qualities depending on whether asphalt base oil, paraffin base oil, or mixed paraffin base oil was used in the process of extraction. The carbon content of the residuum will be directly proportional to the carbon content of the basal oil extracted, that is, all the free carbon is apparently left behind in the residuum as no free carbon and no free asphalt is extracted with the alcohol. The method of alcohol extraction is, therefore, applicable to the separation of lubricating oil from solid or suspended free carbon or other impurities that the oil to be extracted may contain. In some cases, it seems desirable that the number of units of the extraction process may be decreased or increased and different grades of oil may thereby be produced. The adaptability and flexibility of my invention constitutes one of its major advantages because any desired series of extractions may be carried out, resulting in the separation of the original oil, whichever one of those mentioned may have been selected, into such fractions as may be deemed desirable.

The properties, nature and quantities of the different products obtained by the process set forth are naturally dependent on the original composition of the basal oil used in the extraction process, but a typical example of the materials obtainable by the extraction process is the following: As a basal stock a heavy Galena gulf coastal crude oil which has a gravity of 24° Bé. is used. This stock is subjected to the contact-tower extraction process as set forth. The more soluble components of the oil are dissolved first by the alcohol. These soluble components are low gravity and low viscosity oils, between 23° and 24° Bé. gravity. The lightest oil which is extracted in unit 1 will constitute 32 to 33% of the particular gulf coastal crude oil charged into the system. It will have a gravity of 23.8° Bé., a viscosity of 200 seconds Saybolt at 100° F., a flash point of 389° F., and a fire point of 430° F. An example of the light stock obtained is as follows:

Gravity_____ 23. 6° Bé.
Flash_____ 381° F.
Viscosity_____ 207 sec. at 100° F.

The medium lubricating oil produced in unit 2 has viscosity of 310 to 320 seconds Saybolt at 100° F., a gravity of about 26° Bé., a flash point of 420° F., and a fire point of 450° F. The oil constitutes about 25% of the particular oil charged into the system.

The third and most important product of the process is an oil of 600 seconds Saybolt viscosity at 100° F. This high grade oil forms from about 30% of this particular oil charged into the system. It has a remarkable high gravity of 25.2° Bé., to 25.4° Bé.

The fourth product which results to the extent of 8% of the particular oil charged does not necessarily have to be separated but may be included in the product of the third unit if desired. This heavy oil of from 780 to 790 seconds Saybolt viscosity has a gravity of about 23.3° Bé.

It is to be especially noted that since these oils are derived from pure asphalt base crude that the various lubricating oils do not have to be cold pressed. These oils, in addition to not requiring cold pressing, do not need any acid color treatment unless it is desired to obtain pale oil or straw colored oil of 600 seconds viscosity. My invention is especially well adapted for the extraction of asphalt base oils, but is also of exceptional value for mixed or pure paraffin base oils. If paraffin base oils are extracted then, the most important feature possessed by all the extracted oils produced according to my process is their remarkably fine crystallizing qualities. All of the extracted oils which are derived from paraffin or mixed paraffin asphalt basal oils, when chilled for wax extraction purposes, show a crystallization of wax of good firm crystals. There is no formation of the so-called "amorphous wax" which is apparently nothing more than wax prevented from crystal formation due to the presence of a disturbing colloidal substance. Whether the presence of a solvent in the process extracted oils counteracts the influence of such a colloid, or whether the colloid is left behind in the residuum, or whether the action of the alcohol-extraction destroys this disturbing colloidal substance which interferes with crystallizing qualities is not known but the facts are that the extracted oils show excellent crystallizing qualities throughout making the wax-pressing operation especially easily carried out and resulting in a separation of wax and oil which leaves both the wax and the oil in a much purer state than has hitherto been achieved in the art of paraffin wax making due to, (1) the lessened viscosity of the oils, and (2) excellent crystal formation during chilling of all the extracted oils which have been derived from any of the types of oils previously mentioned, derived from paraffin or mixed paraffin-asphalt base oils. After the desired color has been obtained and the oil freed of its paraffin content, the remaining traces of alcohol may be removed to restore the viscosity as disclosed in application Serial No. 71,112, filed Jan. 2, 1926.

The residuum or asphalt produced in the extraction process comprises about 5% of the particular stock charged into the system and is true asphalt of the desired consistency. The gravity of the residuum is 11.3° Bé. At 150° F., the residue oil flows very slowly, has a shiny black appearance and is sticky to the touch. A remarkable feature of the asphalt is that only a small percent of free carbon is present unless found in such fine colloidal suspension that it does not show up when the mass is dissolved in benzine and filtered. Any of the standard methods for dehydrating alcohol may be employed to obtain the anhydrous product used in the process or the alcohol may be bought already anhydrous in the market. Only the initial amount required for the process is large and the amount required later on, is just that needed to replace the slight loss due to vaporization from the continuous closed system.

Methyl, ethyl, propyl and iso-propyl alcohol or mixtures of these alcohols may be used as the extraction medium. These alcohols should be anhydrous or substantially so. For example, satisfactory results have been obtained by using anhydrous alcohol of 99.5% strength. Theoretically, it is possible to carry out the extraction process with alcohol of lower strength. However, when the principle of alcohol extraction is applied in large scale operation, it has been found that the use of a lower strength alcohol is not practical.

The special advantages of my present process of extraction are the simplicity of construction and the entirely automatic control of the extraction process, which requires practically no attention on the part of the operator other than to see that the automatic controls function properly, and that the pumps and other moving agents are properly oiled.

My present extraction process serves admirably for the reconditioning of spent internal combustion lubricating oil. The following is an example of its application to the particular material. The oil which is to be reconditioned is that which has been used in an automobile engine for 500 miles, shows a gravity of 26.9° Bé., a flash of 145° F., and a burning point of 170° F., and a viscosity due to the dilution of 62 seconds. The oil is first subjected to a distillation which removes the gasoline dilution. The distillation is usually carried up to 450° F. and the resulting oil has a very poor color and contains dirt, mostly carbon in suspension.

The oil is pumped from the dirty oil storage tank 13 by means of a pump 14 into the contract extraction tower 1 where the oil spreads in a fine film over the trays or perforated plates and comes in contact with the alcohol vapors from the extract alcohol still 6. The vapors upon coming in contact with the oil will induce the giving up of their heat of condensation to the oil, thereby raising the temperature of the oil to almost that of the boiling point of the solvent. The new condensed alcohol will act upon the thin film of oil and will extract all the lubricating oil, leaving a residue of insoluble carbon, dirt, and other coloring matter. The oil is introduced into the top of the tower at such a rate that all the oil may be dissolved, as the intention in this particular case, is not to separate the oil into various hydrocarbons constituents, but to separate the suspended carbon, dirt, asphalt and other impurities from the lubricating oil, proper. This process of extraction continues until the bottom tray of the tower is reached, when the undissolved muck, dirt and the like, together with the dissolved oil extract passes into a settling tank or collecting tank 2 where the bulk of the undissolved material separates from the extract. The extract together with small portions of undissolved oil pass into the accelerated gravity or centrifugal separator 4 where the remaining traces of undissolved suspended material is removed from the extract which is then forced into the extraction alcohol still 6, by a pump 7ª, where the alcohol is distilled off. The alcohol vapor passes into the dehydrator chamber 8 filled with a suitable dehydrating chemical such as lump lime or anhydrous copper sulphate or other suitable dehydrating material and maintained at such a temperature so that the alcohol vapors will not condense, without going through the dehydrating chamber. The control of the extraction is practically automatic just as in the four unit apparatus. The extracted lubricating oil is removed through the conduit 17 into a suitable storage tank. The only other treatment required is the drying or distilling off the trace of alcohol left in the oil, unless it is desired to improve the chill point of the oil when advantage may be taken of the presence of the alcohol to chill the oil and press the paraffin wax out of it. It is thus possible to take an automobile lubricating oil which originally had a chill of 25° to 30° F. and prepare a reclaimed oil which has a zero cold test. Using the spent oil indicated, the finished reclaimed oil will have without color treatment the following properties:

Viscosity at 100° F____ 300 seconds Saybolt
Gravity _____ 24° Bé.
Flash _____ 420° F.
Burn _____ 465° F.
Color _____ 6-

Cold test (when chilled and pressed to improve cold test) equals 0° F.

This is a typical example of renewed, reclaimed lubricating oil. The viscosity obtainable depends, of course, on the original viscosity of the lubricating oil before it was used in the automobile engine.

The extract alcohol still 6 is equipped with means for automatically regulating the temperature therein, this being preferably accomplished by a thermostatic arrangement.

This may be accomplished by providing the heating coil 18 with a valve 40' actuated by the thermostatic element 41' so that the valve allows the heating medium to enter the coil 18 only when the temperature is below a predetermined limit, that is, the boiling point of the particular solvent alcohol used.

The oil in the storage tank 13 is preferably kept at a uniform temperature by means of an exhaust steam heater located in the tank. The amount of steam entering the coils may be controlled by a thermostatic element acting upon a steam regulating valve whereby the oil enters the extraction tower 1 in a partially heated condition. The oil is preferably heated in the storage tank 13 to a temperature at which the raw oil is fluid and not too viscous, thus facilitating the pumping of the oil to the tower. For most of the oils used this temperature is not in excess of 120 degrees F. If it is desired, to further heat the incoming oil, it is quite feasible to interpose a heat exchanger in the line going to the tower 1 so that the oil in being pumped to the tower is further heated.

In carrying out my invention the alcohol is introduced into the tower 1 in a vaporous state, but the alcohol does not retain its vaporous state in its travel through the successive sections of the tower. Therefore, the alcohol extraction is partly due to vaporous alcohol and partly due to liquid alcohol, all of which has been introduced into the tower in vaporous form in contradistinction to that process, which introduces the alcohol in its liquid state. The alcohol is not only introduced in a vaporous state but preferably in a superheated vaporous condition. The amount of superheat or the number of degrees Fahrenheit to which the alcohol is raised beyond its natural boiling point is determined by the number of plates in the extraction tower which influences directly the pressure or resistance offered the alcohol vapor. For example, at seven pounds total pressure beyond atmospheric, the boiling point will be raised, to approximately 190° F. for ethyl alcohol. But another factor enters into the calculations; for, granted that the alcohol is at 190° F. when it first comes in contact with the oil which flows countercurrently to the upward flow of the vapor of alcohol, there must be sufficient heat in the alcohol so that some alcohol vapor reaches the top tray, otherwise the top tray would not be accomplishing any extraction of oil and hence would be valueless. Under the conditions as given with the size tower described, a superheat of 10° F. is desirable so that the temperature of the alcohol is held at 200° F. This temperature gets progressively less the higher up the vapor passes as the vapor loses all of its sensible heat and as some of the vapor also gives up its latent heat of vaporization and condensation.

I have previously described how the inflow of oil into the extraction tower 1 is controlled. The amount of alcohol required to extract a given percentage of oil is determined experimentally. Then the alcohol still is run at such a rate so that enough alcohol is distilled per hour to extract the desired percentage of oil. If the amount of vapor has been adjusted then the amount of oil is automatically released by the pump 14 actuated by the relay thermostatic control 39 as previously described. The amount of oil pumped into the tower 1 is measured by any desirable means, for instance, stroke counters on the feed pump. The amount of extract pumped into the extract alcohol still 6 is also recorded, and the amount of undissolved oil is known, for its quantity is measured by the feed pump for the extraction tower of the second unit. If the amount of oil pumped into the tower of the first unit is called A and the amount of oil pumped into the tower of the second unit is called B, which is also the amount of undissolved oil and the amount of extract pumped into the extract alcohol still 6 of the first unit is called C, then there results the following simple relation:

A (raw oil) —B (undissolved oil) = D (or oil dissolved in first unit)
C (extract) —D (oil dissolved in unit 1) = E (amount of alcohol circulated)

If it has been determined by experiment that in the first unit it requires 2½ pounds of alcohol to extract 1 pound of oil and if the first fraction represents only 25% of the basal oil charged, then we have the following relative amounts:

D = 1 gallon
C = 1 plus 2½ = 3½ gallons
E = 2½ gallons
D = 25% = 1 gallon
A = 100% = 4 gallons
B = 75% = 3 gallons From this relation it is seen that for this particular oil if four gallons of raw oil A are pumped into tower 1 and then pass vapor E, resulting from 2½ gallons of alcohol through the tower 1, there is obtained two gallons of alcohol B which is to be extracted in the succeeding units and 3½ gallons of alcohol extract C, which is pumped into the extract still for the alcohol to be distilled therefrom. The ratio of the dissolved oil in the extract to the amount of alcohol is in a similar relation for the other units.

What I claim is:

1. In apparatus for extracting hydrocarbons with alcohol, the combination of an oil storage tank, a contact-extraction tower, means for conveying oil from the former to the latter, means for introducing alcohol into the extraction tower, means for removing extracted oil therefrom, an alcohol extract still in operative connection with the extraction tower, an alcohol dehydrator and means for cutting the dehydrator in and out of operative connection with said alcohol extract still and tower.

2. In apparatus for extracting hydrocarbons with alcohol, the combination of an oil storage tank, an extraction tower, an oil pump therebetween for carrying oil from the former to the latter, means for introducing alcohol into said extraction tower, a condenser in connection therewith having a cooling medium to condense alcohol vapor, automatic means controlled by the temperature of the alcohol vapor flowing to the condenser for regulating and admitting the raw oil into the extraction tower, and automatic means for controlling the temperature of the cooling medium so that the alcohol vapor will be cooled only to a predetermined temperature.

3. In apparatus for extracting hydrocarbons with alcohol, the combination of an oil storage tank, an extraction tower, an oil pump having a steam valve for regulating the introduction of steam into the pump steam-chamber, a relay in connection with said steam valve, a condenser in operative connection with the extraction tower, a cooling coil in said condenser connected to an alcohol return pipe for returning alcohol to the extraction tower, a thermostatic control in connection with said extraction tower and operating said relay and pump when the temperature in the extraction tower falls below a predetermined limit, a thermostatic element in the alcohol return pipe and a water regulating valve in connection with the condenser to be opened and closed by the operation of said thermostatic element.

4. In apparatus for extracting hydrocarbons with alcohol, the combination of an extraction tower, a condenser employing a cooling medium in operative connection with the extraction tower, an alcohol return pipe between the alcohol extraction tower and the condenser, a thermostatic element in the alcohol return pipe, a water regulating valve in connection with the condenser, to be opened and closed by the operation of said thermostatic element, means for supplying oil to said extracting tower, and means controlled by the temperature of the alcohol vapor at the top of said tower for controlling the action of the last mentioned means.

5. In apparatus for extracting hydrocarbons with alcohol, in combination with an oil storage tank, an extraction tower, an oil pump having a steam valve for regulating the introduction of steam into the pump steam-chamber, said pump being connected to the storage tank and tower to supply oil to the tower, a relay in connection with said steam valve and a thermostatic control in connection with said extraction tower and operating said relay and pump when the temperature of the extraction tower falls below a predetermined limit.

6. In apparatus for extracting hydrocarbons with alcohol, the combination of an oil storage tank, a contact-extraction tower, means for conveying oil from the former to the latter, means for introducing alcohol into the extraction tower, a settling and collection tank connected to the bottom of the extraction tower, a separator connected to the settling and collection tank, means for removing extracted oil therefrom, an alcohol extract still in operative connection with said extraction tower and separator, an alcohol dehydrator adapted to be cut in the connection supplying alcohol from the still to the tower, a condenser for alcohol vapor, a vapor flow pipe leading from the top of the tower to the condenser, a return pipe leading from the condenser to the tower, a thermostatic element in said flow pipe, and means controlled by the action of the thermostatic element and connected to the first mentioned means to control the action thereof.

7. In apparatus for extracting hydrocarbons with alcohol, the combination of an oil storage tank, a contact-extraction tower, means for conveying oil from the former to the latter, means for introducing alcohol into the extraction tower, a settling and collection tank connected to the bottom of the extraction tower, a separator connected to the settling and collection tank, means for removing extracted oil therefrom, an alcohol extract still in operative connection with said extraction tower and separator, an alcohol dehydrator adapted to be cut in the connection supplying alcohol from the still to the tower, a condenser for alcohol vapor, a vapor flow pipe leading from the top of the tower to the condenser, a return pipe leading from the condenser to the tower, a thermostatic element in said flow pipe, means controlled by the action of the thermostatic element and connected to the first mentioned means to control the action thereof, valve controlled means for supplying cooling fluid to the condenser, a thermostatic element in said return pipe, and an operative connection between the last mentioned thermostatic element and the valve of said cooling fluid supply.

8. In apparatus for extracting hydrocarbons with alcohol, the combination of an oil storage tank, a contact-extraction tower carrying a series of perforated trays or plates, adapted to hold a shallow body of oil, means for conveying oil from the former to the latter, means for introducing extracted oil therefrom below said perforated plates and including a settling and collection tank connected to the bottom of said tower, a separator connected to said last tank, an alcohol extract still in operative connection with said extraction tower and separator, an alcohol dehydrator adapted to be cut in the connection supplying alcohol from the still to the tower, a condenser for alcohol vapor, a vapor flow pipe leading from the top of the tower to the condenser, a return pipe leading from the condenser to the tower, a thermostatic element in said flow pipe, and means controlled by the action of the thermostatic element and connected to the first mentioned means to control the action thereof.

9. In apparatus for extracting hydrocarbons with alcohol, the combination of an oil storage tank, a contact-extraction tower carrying a series of perforated trays or plates, adapted to hold a shallow body of oil, means for conveying oil from the former to the latter, means for introducing extracted oil therefrom below said perforated plates and including a settling and collection tank connected to the bottom of said tower, a separator connected to said last tank, an alcohol extract still in operative connection with said extraction tower and separator, an alcohol dehydrator adapted to be cut in the connection supplying alcohol from the still to the tower, a condenser for alcohol vapor, a vapor flow pipe leading from the top of the tower to the condenser, a return pipe leading from the condenser to the tower, a thermostatic element in said flow pipe, means controlled by the action of the thermostatic element and connected to the first mentioned means to control the action thereof, valve controlled means for supplying cooling fluid to the condenser, a thermostatic element in said return pipe, and an operative connection between the last mentioned thermostatic element and the valve of said cooling fluid supply.

In testimony whereof I hereunto affix my signature.

THEODORE A. WERKENTHIN.